US012744173B2

(12) United States Patent
Hofsaess

(10) Patent No.: US 12,744,173 B2
(45) Date of Patent: Sep. 22, 2026

(54) TEMPERATURE-DEPENDENT SWITCHING MECHANISM AND TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 241 days.

(21) Appl. No.: 18/587,150

(22) Filed: Feb. 26, 2024

(65) Prior Publication Data

US 2024/0290560 A1 Aug. 29, 2024

(30) Foreign Application Priority Data

Feb. 28, 2023 (DE) ..................... 10 2023 104 836.8

(51) Int. Cl.
*H01H 37/54* (2006.01)
*H01H 37/04* (2006.01)

(52) U.S. Cl.
CPC ............ *H01H 37/54* (2013.01); *H01H 37/04* (2013.01); *H01H 2037/5481* (2013.01)

(58) Field of Classification Search
CPC .................. H01H 37/54; H01H 37/04; H01H 2037/5481; H01H 37/5427; H01H 37/64; H01H 37/52
See application file for complete search history.

(56) References Cited

U.S. PATENT DOCUMENTS

| | | | |
|---|---|---|---|
| 2,622,169 A | 12/1952 | Cataldo et al. | |
| 3,931,603 A | 1/1976 | Mckery | |
| 4,306,211 A | 12/1981 | Hofsaess | |
| 5,745,022 A * | 4/1998 | Becher | H01H 1/504 337/377 |
| 5,939,970 A | 8/1999 | Tsuji et al. | |
| 6,724,293 B1 | 4/2004 | Hofsaess | |
| 9,640,351 B2 | 5/2017 | Le Nguyen | |
| 11,264,194 B2 | 3/2022 | Hofsaess | |
| 11,282,662 B2 | 3/2022 | Hofsaess | |
| 11,476,066 B2 | 10/2022 | Hofsaess | |
| 2013/0127585 A1 | 5/2013 | Hofsaess | |
| 2013/0271258 A1* | 10/2013 | Hofsaess | H01H 1/021 337/298 |
| 2014/0225709 A1 | 8/2014 | Kirch et al. | |

(Continued)

FOREIGN PATENT DOCUMENTS

| | | |
|---|---|---|
| DE | 892468 C | 10/1953 |
| DE | 2917482 A1 | 11/1980 |

(Continued)

OTHER PUBLICATIONS

Search Report issued by the European Patent Office for application 24159331.8 on Jul. 22, 2024.

*Primary Examiner* — Stephen S Sul
(74) *Attorney, Agent, or Firm* — Reising Ethington P.C.

(57) ABSTRACT

A temperature-dependent switching mechanism for a temperature-dependent switch, comprising an electrically conductive contact member; a contact ring arranged around the contact member and movably mounted on the contact member; and a temperature-dependent bimetallic snap-action disc comprising a first through hole through which the contact member is passed, wherein the bimetallic snap-action disc is arranged on a first side of the contact ring and is movably mounted on the contact member.

15 Claims, 6 Drawing Sheets

(56) References Cited

U.S. PATENT DOCUMENTS

| | | | | |
|---|---|---|---|---|
| 2014/0320257 | A1* | 10/2014 | Hofsaess | H01H 37/52 337/365 |
| 2015/0061818 | A1 | 3/2015 | Klaschewski et al. | |
| 2015/0109092 | A1* | 4/2015 | Neumann | H01H 37/54 337/365 |
| 2020/0343064 | A1* | 10/2020 | Hofsaess | H01H 37/04 |
| 2021/0118636 | A1* | 4/2021 | Hofsaess | H01H 37/323 |
| 2021/0166900 | A1* | 6/2021 | Hofsaess | H01H 37/64 |

FOREIGN PATENT DOCUMENTS

| | | | |
|---|---|---|---|
| DE | 19919648 | A1 | 12/2000 |
| DE | 102007014237 | A1 | 9/2008 |
| DE | 202013101153 | U1 | 3/2013 |
| DE | 102011119632 | B3 | 4/2013 |
| DE | 102013101392 | A1 | 8/2014 |
| DE | 102019125452 | A1 | 3/2021 |
| DE | 102019125453 | A1 | 3/2021 |
| EP | 2854149 | A1 | 4/2015 |
| EP | 3796358 | A1 | 3/2021 |
| EP | 3796360 | A1 | 3/2021 |

* cited by examiner

TEMPERATURE-DEPENDENT SWITCHING MECHANISM AND TEMPERATURE-DEPENDENT SWITCH

CROSS-REFERENCE TO RELATED APPLICATIONS

This application claims priority from German patent application DE 10 2023 104 836.8, filed on Feb. 28, 2023. The entire content of this priority application is incorporated herein by reference.

FIELD

The present disclosure generally relates to a temperature-dependent switching mechanism and a temperature-dependent switch that may comprise such a temperature-dependent switching mechanism.

BACKGROUND

An exemplary temperature-dependent switch is disclosed in DE 10 2011 119 632 B3.

Such temperature-dependent switches are used in a principally known manner to monitor the temperature of a device. For this purpose, the switch is brought into thermal contact with the device to be protected, e.g. via one of its outer surfaces, so that the temperature of the device to be protected influences the temperature of the switching mechanism arranged inside the switch.

The switch is typically connected electrically in series into the supply circuit of the device to be protected via connecting leads, so that below the response temperature of the switch, the supply current of the device to be protected flows through the switch.

In the switch disclosed in DE 10 2011 119 632 B3, the switching mechanism is arranged inside a switch housing. The switch housing is formed in two parts. It comprises a lower part that is firmly connected to a cover part with an insulating foil interposed therebetween. The temperature-dependent switching mechanism arranged in the switch housing comprises a snap-action spring disc to which a movable contact member is attached, and a bimetallic snap-action disc imposed on the movable contact member. The snap-action spring disc presses the movable contact member against a stationary counter contact arranged on the inside of the switch housing on the cover part. The outer edge of the snap-action spring disc is supported in the lower part of the switch housing so that the electrical current flows from the lower part through the snap-action spring disc and the movable contact member into the stationary counter contact and from there into the cover part.

The temperature-dependent bimetallic snap-action disc is essentially responsible for the temperature-dependent switching behavior of the switch. This is usually configured as a multilayer, active, sheet-metal component composed of two, three or four interconnected components with different thermal expansion coefficients. In such bimetallic snap-action discs, the individual layers of metals or metal alloys are usually joined by material bonding or positive locking, for example by rolling.

Such a bimetallic snap-action disc has a first stable geometric configuration (low-temperature configuration) at low temperatures, below the response temperature of the bimetallic snap-action disc, and a second stable geometric configuration (high-temperature configuration) at high temperatures, above the response temperature of the bimetallic snap-action disc. The bimetallic snap-action disc snaps from its low-temperature configuration to its high-temperature configuration in a temperature-dependent manner in the manner of a hysteresis. Thus, if the temperature of the bimetallic snap-action disc rises above the response temperature of the bimetallic snap-action disc as a result of a temperature increase in the device to be protected, the latter snaps from its low-temperature configuration to its high-temperature configuration. Thereby, the bimetallic snap-action disc works against the snap-action spring disc in such a way that it lifts the movable contact member from the stationary counter contact, so that the switch opens and the device to be protected is switched off and cannot heat up any further.

Unless a reset lock is provided, the bimetallic snap-action disc snaps back to its low-temperature configuration so that the switch is closed again as soon as the temperature of the bimetallic snap-action disc drops below the so-called snap-back temperature of the bimetallic snap-action disc as a result of the cooling of the device to be protected.

In its low-temperature configuration, the bimetallic snap-action disc is preferably mounted in the switch housing in a mechanically force-free manner, and the bimetallic snap-action disc is also not used to carry the current. This has the advantage that the bimetallic snap-action disc has a longer service life and that the switching point, i.e. the response temperature of the bimetallic snap-action disc, does not change even after many switching cycles.

In the case of a large number of temperature-dependent switches, the bimetallic snap-action disc is therefore preferably inserted as a loose individual part in the switch housing during manufacture of the switch, wherein the bimetallic snap-action disc is imposed on the contact member attached to the spring snap-action disc, for example with a central through hole provided therein. Only when the switch housing is closed is the bimetallic snap-action disc then fixed in position and its position relative to the other components of the switching mechanism determined. However, the production of such a switch in which the bimetallic snap-action disc is inserted individually has proved to be relatively cumbersome, as several steps are required to insert the switching mechanism into the switch housing.

In the switch known from DE 10 2011 119 632 B3, the bimetallic snap-action disc is therefore connected in advance (outside the switch housing) to the contact member attached to the snap-action spring disc. For this purpose, the bimetallic snap-action disc is imposed on the contact member and then an upper collar of the contact member is folded down. As a result, not only is the snap-action spring disc attached to the contact member, but the bimetallic snap-action disc is also held captive on the latter.

The switching mechanism, which is composed of the bimetallic snap-action disc, the spring snap-action disc and the contact member, can thus be manufactured in advance as a semi-finished product that forms a captive unit and can be kept separately in stock as bulk material. When the switch is manufactured, the switching mechanism can then be inserted into the switch housing as a captive unit in a single work step. This simplifies the production of the switch many times over.

In the switch disclosed in DE 10 2011 119 632 B3, the snap-action spring disc is welded or soldered to the contact member in order to establish the best possible electrical contact between the two components. However, it has been shown that, in particular during bulk storage of the switching mechanism prefabricated as a semi-finished product, the welding or soldering device between the contact member and the snap-action spring disc can break. Such defective switching mechanism can then of course no longer be used.

DE 199 19 648 A1 also proposes a temperature-dependent switch whose switching mechanism can be produced in advance as a semi-finished product. In this switching mechanism, too, the bimetallic snap-action disc, the snap-action spring disc and the contact member already form a captive unit before installation in the switch housing, which can be inserted into the switch housing as a whole during production of the switch and can be kept in stock in advance as bulk material. In this switching mechanism, the contact member has a sheath of softer metal and a core of electrically conductive, harder metal. The bimetallic snap-action disc and snap-action spring disc are fitted to the sheath and molded into the softer metal of the sheath. However, it has been found that this type of connection often leads to unintentional detachment of the bimetallic snap-action disc and/or the snap-action spring disc from the contact member during storage of the switching mechanism.

A further possibility of pre-manufacturing the switching mechanism as a semi-finished product is known from DE 29 17 482 A1 and DE 10 2007 014 237 A1. The captive unit of the switching mechanism is achieved by connecting the bimetallic snap-action disc and the spring snap-action disc with each other via a rivet. Depending on the design of the switch, this rivet can also form the movable contact member of the switching mechanism. The rivet is composed of two parts and comprises a rivet bolt cooperating with a hollow rivet or a rivet bolt with a counterholder attached to it.

While this type of riveted connection between the snap-action spring disc and the bimetallic snap-action disc has proven to be a mechanically long-term resistant connection, the riveted connection does, however, lead to other disadvantages. For example, the bimetallic snap-action disc is usually fixed to the rivet, which can lead to deformation and thus to malfunctions of the bimetallic snap-action disc.

A further difficulty in manufacturing the above-mentioned temperature-dependent switches is that the individual components of the switching mechanism must be very precisely matched to each other in terms of their tolerances. For example, the size and curvature of the bimetallic snap-action disc must be very precisely matched to the size and curvature of the snap-action spring disc in order to adapt the switching mechanism exactly to the size and conditions of the switch housing surrounding the switching mechanism and thus guarantee smooth switching behavior of the switching mechanism. This can even mean that certain production-related tolerances on the bimetallic snap-action disc have to be manually compensated for by tolerances on the snap-action spring disc (or vice versa) during the assembly of the temperature-dependent switch. This is time-consuming and therefore also costly.

SUMMARY

It is an object to provide a temperature-dependent switching mechanism which may overcome the above-mentioned disadvantages. It is particularly an object to provide a temperature-dependent switching mechanism that can be produced simply and inexpensively from as few components as possible as a semi-finished product and can be stored as bulk material without thereby being susceptible to damage leading to a defect in the switching mechanism. It should also be easier to compensate for tolerances of the components of the switching mechanism.

According to an aspect, a temperature-dependent switching mechanism is presented, comprising: an electrically conductive contact member; a contact ring arranged around and movably mounted on the electrically conductive contact member; and a bimetallic snap-action disc comprising a first through hole through which the electrically conductive contact member is passed, wherein the bimetallic snap-action disc is arranged on a first side of the contact ring and is movably mounted on the electrically conductive contact member.

According to a further aspect, a temperature-dependent switch is presented, comprising: a temperature-dependent switching mechanism; and a switch housing surrounding the switching mechanism and having a first electrical terminal and a second electrical terminal; wherein the temperature-dependent switching mechanism comprises: an electrically conductive contact member; a contact ring arranged around and movably mounted on the electrically conductive contact member; and a bimetallic snap-action disc comprising a first through hole through which the electrically conductive contact member is passed, wherein the bimetallic snap-action disc is arranged on a first side of the contact ring and is movably mounted on the electrically conductive contact member; wherein the temperature-dependent switching mechanism is configured to establish an electrical connection between the first and the second electrical terminal below a response temperature of the bimetallic snap-action disc and to interrupt the electrical connection upon exceeding the response temperature.

The presented switching mechanism thus comprises an electrically conductive contact member which is passed through a through-hole provided in the bimetallic snap-action disc. Likewise, the contact member is passed through a contact ring arranged around the contact member. The contact member therefore protrudes through the bimetallic snap-action disc and the contact ring.

The bimetallic snap-action disc and the contact ring are each mounted so that they can move relative to the contact member but cannot be lost (captive). The contact member thus forms together with the bimetallic snap-action disc and the contact ring a captive unit, which can be pre-produced as a semi-finished product and stored as bulk material and can then be inserted as a unit into a corresponding switch housing when the switch is assembled.

The contact ring serves as a contact or support for the bimetallic snap-action disc and can also provide the electrical contact for the derailleur. The contact ring can therefore alternatively also be referred to as a support ring.

In contrast to most temperature-dependent switching mechanisms known from the prior art and used in the switches mentioned at the beginning, the herein presented contact ring is not configured in the conventional way as a support shoulder that is integrally or permanently connected to the electrically conductive contact member. Instead, the contact ring is movably mounted on the electrically conductive contact member. This means that not only the bimetallic snap-action disc but also the contact ring can move relative to the contact member. This has proven to be an immense advantage, as the tolerances of the switching mechanism components can be automatically compensated for by the movement of the contact member.

This means that it is not necessary to assign different devices to different sizes when manufacturing the switching mechanism, as the only thing that matters is the overall height of the switching mechanism and its adjustment to the level of the switch housing. In addition, the bimetallic snap-action disc does not necessarily have to be pre-curved to an exact level/curvature, as the mobility of the contact ring relative to the contact member automatically ensures height and curvature compensation. Accordingly, the components of the switching mechanism no longer have to be dimensioned with such tight tolerances compared to conventional temperature-dependent switching mechanisms of this type.

In a refinement, the bimetallic snap-action disc bears against the contact ring with an inner section surrounding the through hole.

Preferably, the inner section of the bimetallic snap-action disc bears against the contact ring on one side. The contact ring thus holds the bimetallic snap-action disc captive on the contact member from one side. In addition, the contact ring, which itself is movably mounted on the contact member, enables movement of the bimetallic snap-action disc relative to the contact member, wherein the contact ring limits the movement of the bimetallic snap-action disc at least on one side.

In a further refinement, the bimetallic snap-action disc is configured to switch in a temperature-dependent manner between a geometric low-temperature configuration and a geometric high-temperature configuration, wherein the contact ring is configured to move relative to the contact member when the bimetallic snap-action disc switches from its low-temperature configuration to its high-temperature configuration.

In particular, the contact ring moves with the bimetallic snap-action disc relative to the contact member, namely when the bimetallic snap-action disc changes from its low-temperature configuration to its high-temperature configuration or vice versa. Since both the bimetallic snap-action disc and the contact ring are held captive on the contact member, their movement relative to the contact member is limited.

Preferably, the bimetallic snap-action disc and the contact ring can only move relative to the contact member between an upper end stop located on the contact member and a lower end stop located on the contact member.

In a further refinement, the contact member comprises a bearing section extending along a longitudinal axis and having a first diameter, a head section arranged at a first end of the bearing section and having a second diameter larger than the first diameter, and a foot section arranged at a second end of the bearing section opposite the first end and having a third diameter larger than the first diameter, wherein the contact ring and the bimetallic snap-action disc are mounted on the bearing section so as to be movable but captive along the longitudinal axis between the head section and the foot section.

The upper end stop limiting the movement of the bimetallic snap-action disc and the contact ring is arranged on the head section and the lower end stop limiting the movement of the bimetallic snap-action disc and the contact ring is arranged on the foot section.

The bimetallic snap-action disc and the contact ring can therefore move along the longitudinal axis of the bearing section of the contact member in particular. Preferably, this longitudinal axis is oriented in the height direction of the contact member. The mobility of the bimetallic snap-action disc and the contact ring relative to the contact member thus enables, in particular, tolerance compensation in the height direction of the switching mechanism.

In a further refinement, the switching mechanism is rotationally symmetrical about the longitudinal axis.

This makes it very easy to insert the switching mechanism into a switch housing. In addition, this makes it possible to achieve an optimum force effect from the bimetallic snap-action disc on the contact member, which is equally distributed in the circumferential direction.

In a further refinement, the bearing section is cylindrical.

The term “cylindrical” is understood in the present case to mean any body whose cross-sectional area is constant along the longitudinal axis. “Cylindrical” therefore does not necessarily imply a circular-cylindrical shape. Instead of a circular cross-sectional area, the cylindrical body can, for example, also have an angular or oval cross-sectional area.

In a further refinement, an inner diameter of the contact ring and an inner diameter of the through hole are each larger than the first diameter.

This guarantees sufficiently free movement of the bimetallic snap-action disc and the contact ring relative to the bearing section of the contact member. The bimetallic snap-action disc and the contact ring can thus move relative to the bearing section of the contact member with as little friction as possible.

In a further refinement, an outer diameter of the contact ring is smaller than the second diameter. In other words, the outer diameter of the contact ring is smaller than the diameter of the head section of the contact member.

The advantage of the smallest possible configuration of the contact ring is that it can have a comparatively small mass and is therefore easy to move. In addition, the contact ring serves as a support for the bimetallic snap-action disc. However, the contact ring does not collide undesirably with parts of the bimetallic snap-action disc when it snaps from its low-temperature configuration to its high-temperature configuration (or vice versa).

In a further refinement, the second diameter is at least 50% larger than the first diameter.

This has the advantage, in particular, that by this comparatively large design of the head section of the contact member, the head section not only serves as an end stop for the bimetallic snap-action disc and/or the contact ring, but also provides arc shielding at the same time. This is because the head section of the contact member is typically in contact with a stationary mating contact in the low-temperature state of the switch and is lifted from the stationary mating contact upon exceeding the response temperature of the bimetallic snap-action disc in order to interrupt the electrically conductive connection previously closed by the switch. During these switching operations, an arc can occur between the contact member and the stationary mating contact. If the head section of the contact member is as large as possible, as mentioned above, the head section can serve as an arc shield, which ensures that the bimetallic snap-action disc and the other components of the temperature-dependent switching mechanism are shielded from this arc. Damage to the switching mechanism caused by arcs such as this can thus be effectively avoided.

In a further refinement, the bearing section is integrally connected to the head section and the foot section of the contact member. In other words, the contact member is preferably configured as a single piece.

Such an integral or single piece configuration of the contact member has various advantages. On the one hand, this reduces the number of components in the switching mechanism. On the other hand, this ensures a mechanically stable configuration of the contact member. Furthermore, this improves the electrical conductivity of the contact member.

In a further refinement, the temperature-dependent switching mechanism furthermore comprises a temperature-independent snap-action spring disc which comprises a second through hole through which the contact member is passed, wherein the snap-action spring disc is arranged on a second side of the contact ring opposite the first side and is movably but captively mounted on the contact member.

As it is already known from the prior art, such a spring disc can provide relief for the bimetallic snap-action disc, since the contact pressure can then be caused by the spring disc, for example in the low-temperature state of the switch, and the bimetallic snap-action disc can be force-free in this switch state, which has a positive effect on the service life of the bimetallic snap-action disc.

The snap-action spring disc in this refinement is movably but captively mounted on the contact member together with the bimetallic snap-action disc and the contact ring, so that even then the switching mechanism forms a captive unit which can be pre-produced as a semi-finished product and stored as bulk material.

The contact member penetrates both the snap-action spring disc and the bimetallic snap-action disc. The two snap-action discs are arranged on opposite sides of the contact ring. The contact ring therefore provides a movable spatial separation of the two snap-action discs and can also be used for electrical contacting of the two snap-action discs.

In a further refinement, the snap-action spring disc is configured as a bistable snap-action spring disc having two temperature-independent stable geometric configurations. The bimetallic snap-action disc is also preferably configured as a bistable bimetallic snap-action disc having two temperature-dependent stable geometric configurations.

"Bistable" in this respect means that the respective snap-action disc has two different, stable geometric configurations/states (used synonymously here), wherein the two stable configurations/states of the bimetallic snap-action disc are temperature-dependent and the two stable configurations/states of the snap-action spring disc are temperature-independent.

This ensures that the two snap-action discs remain stable in their respective states after snapping from one state to the other without any unwanted snapping back. A snapping-action of the switching mechanism therefore only occurs upon exceeding the response temperature of the bimetallic snap-action disc and when the temperature of the bimetallic snap-action disc falls below the reset temperature. The snap-action spring disc thereby snaps together with the bimetallic snap-action disc and is forced into its respective other configuration/state by the latter.

In a further refinement, the first through hole is arranged centrally in the bimetallic snap-action disc and the second through hole is arranged centrally in the snap-action spring disc.

The bimetallic snap-action disc and the snap-action spring disc are preferably each circular disc-shaped.

As already mentioned, the present disclosure relates not only to the switching mechanism itself, but also to a temperature-dependent switch in which such a temperature-dependent switching mechanism may be inserted.

In a refinement, the switching mechanism is configured to press the electrically conductive contact member below the response temperature of the bimetallic snap-action disc directly against a stationary mating contact electrically connected to the first electrical terminal and arranged inside the switch housing in order to establish the electrical connection.

The electrically conductive contact member belonging to the switching mechanism thus serves as a movable contact member within the switch, which is in direct contact with the stationary mating contact in the low-temperature state of the switch and is lifted off this stationary mating contact in the high-temperature state of the switch. In the low-temperature state of the switch, i.e. below the response temperature of the bimetallic snap-action disc, the head section of the electrically conductive contact member is in direct contact with the stationary mating contact or bears against this stationary mating contact.

It is to be understood that the features mentioned above and those to be explained below can be used not only in the combination indicated in each case, but also in other combinations or on their own, without departing from the scope of the present disclosure.

DESCRIPTION OF PREFERRED EMBODIMENTS

Figure 1:
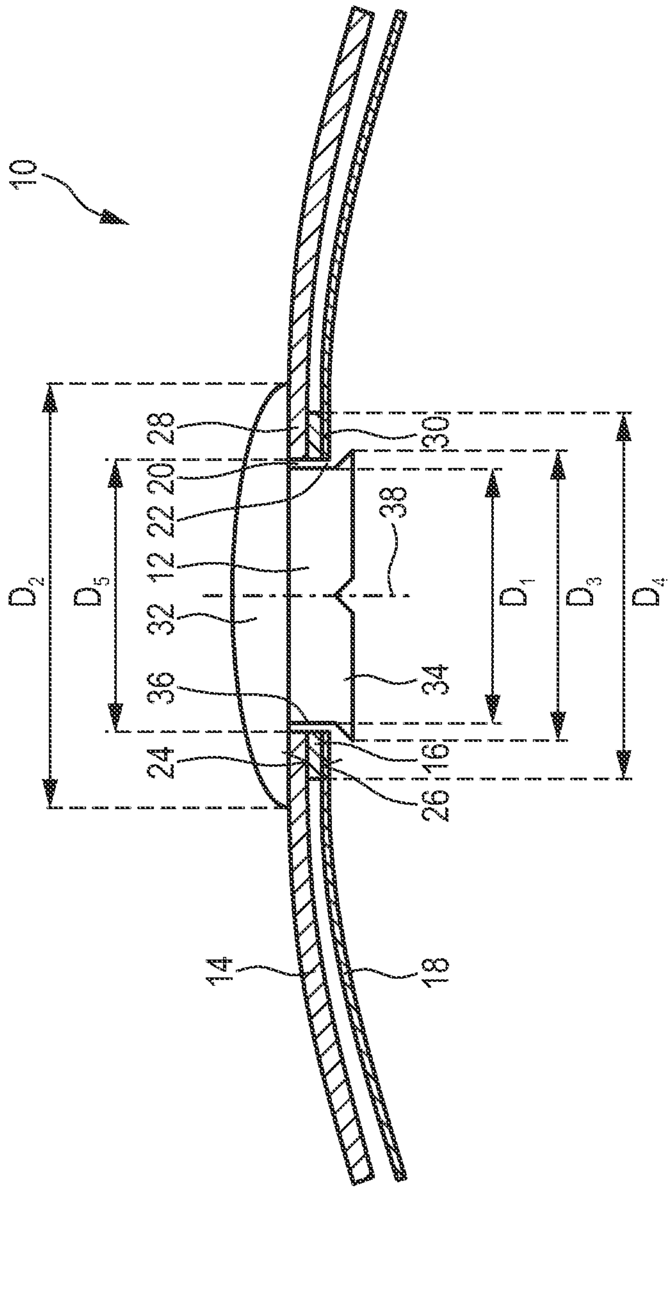
FIG. 1 shows a schematic sectional view of a temperature-dependent switching mechanism according to a first embodiment.

FIG. 1 shows a schematic sectional view of a first embodiment of the switching mechanism. The switching mechanism is denoted therein in its entirety with the reference numeral 10.

The switching mechanism 10 is a temperature-dependent switching mechanism. As explained in more detail in the following, the switching mechanism 10 switches between a low-temperature state and a high-temperature state depending on the temperature.

The switching mechanism 10 has a four-component design. It comprises a contact member 12, a temperature-dependent bimetallic snap-action disc 14, a contact ring 16 and a temperature-independent snap-action spring disc 18. The bimetallic snap-action disc 14, the contact ring 16 and the snap-action spring disc 18 are held captive on the contact member 12, but are mounted so that they can move relative to it.

Figure 2:
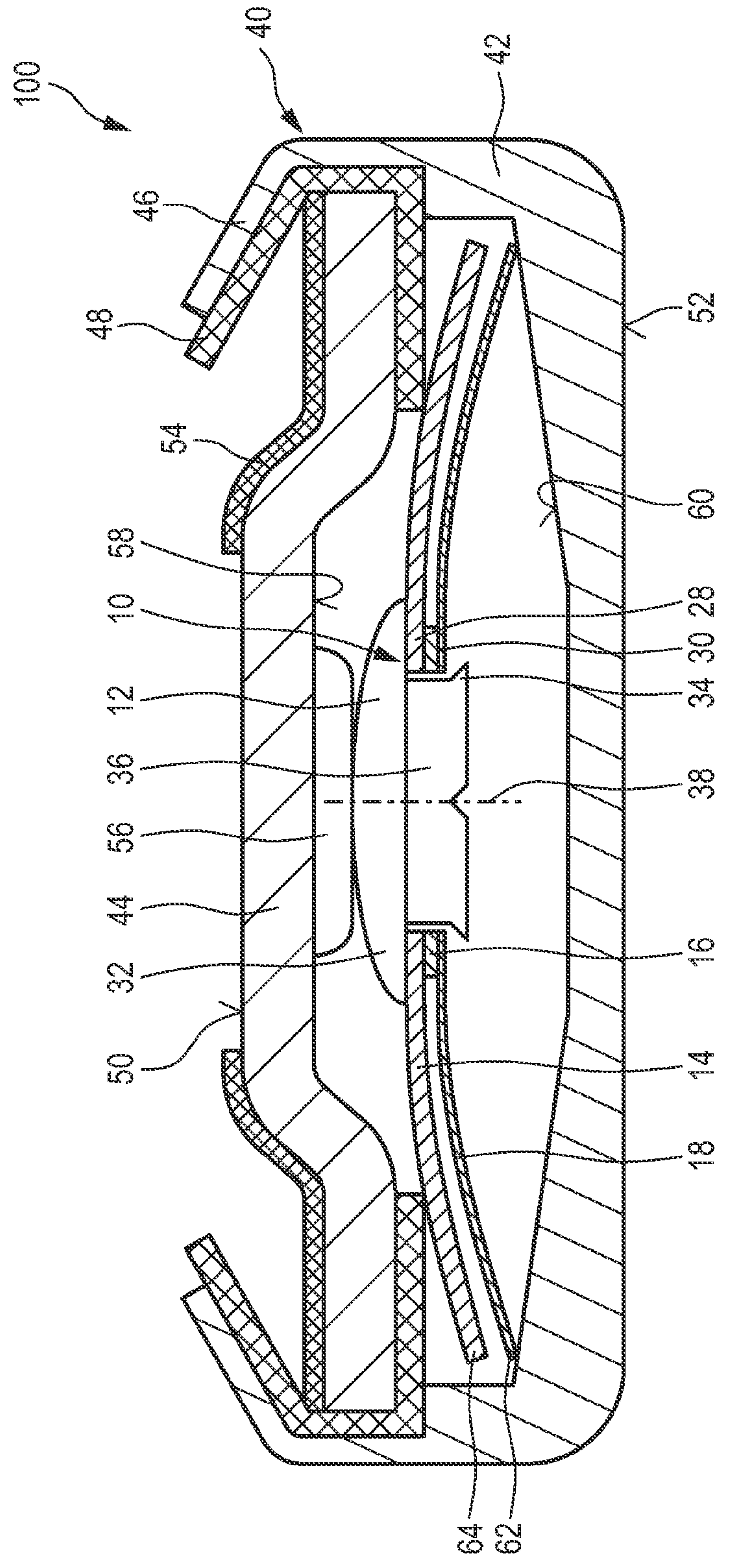
FIG. 2 shows a schematic sectional view of a temperature-dependent switch having the switching mechanism shown in FIG. 1, wherein the switch is in its low-temperature state.
Figure 3:
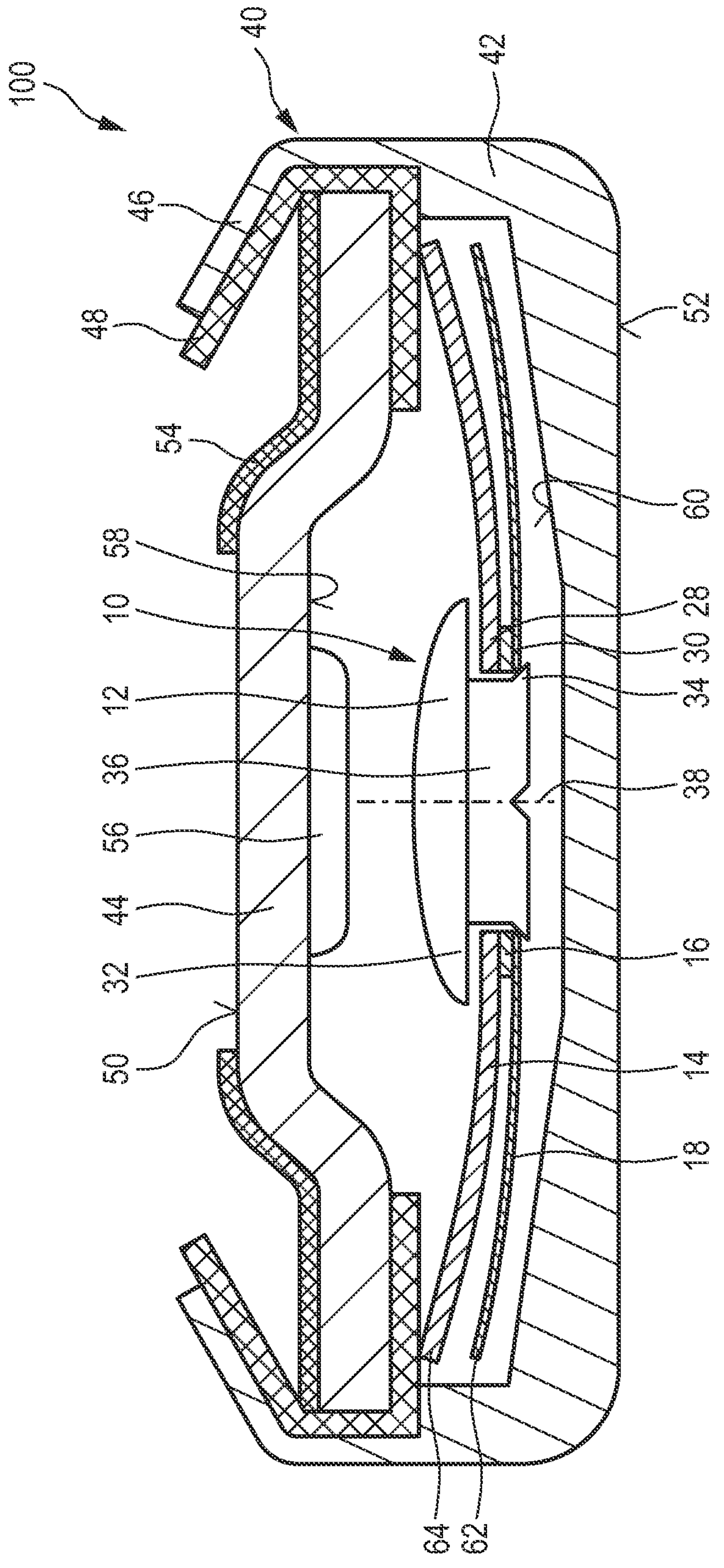
FIG. 3 shows a schematic sectional view of the switch shown in FIG. 2, wherein the switch is in its high-temperature state.

Since the bimetallic snap-action disc 14, the contact ring 16 and the snap-action spring disc 18 are held captive on the contact member 12, unintentional detachment of the components 14, 16, 18 from the contact member 12 is prevented. The switching mechanism 10 can thus be pre-produced as a semi-finished product and then installed as a complete unit in a corresponding switch, as shown in FIGS. 2 and 3, for example.

The two snap-action discs 14, 18 are preferably circular in shape, wherein each comprises a centrally arranged through hole 20, 22. The through hole 20 arranged centrally in the bimetallic snap-action disc 14 is referred to as the first through hole in the present case. The through hole 22 arranged centrally in the snap-action spring disc 18 is referred to as the second through hole.

The two snap-action discs 14, 18 are fitted over the contact member 12 with their respective through holes 20, 22 and rest from different sides against the contact ring 16, which is also fitted over the contact member 12. The bimetallic snap-action disc 14 bears against the top side 24 of the contact ring 16, which is herein referred to as the first side. The snap-action spring disc 18 bears against the opposite bottom side 26 of the contact ring 16, which is herein referred to as the second side of the contact ring 16. Both snap-action discs 14, 18 bear against the contact ring 16 with their respective inner sections 28, 30, i.e. in particular with the respective central region surrounding the respective through hole 20, 22.

The contact member 12 is preferably made of metal. It comprises a head section 32, a foot section 34 and a bearing section 36 arranged between the head section 32 and the foot section 34. All three sections 32, 34, 36 are integrally connected to each other, i.e. formed in one piece.

Overall, the contact member 12 is essentially mushroom-shaped in this embodiment. The head section 32 is essentially cap-shaped, the bearing section 36 is cylindrical, and the base section 34 is essentially dovetail-shaped. However, it will be understood that the three aforementioned sections 32, 34, 36 of the contact member 12 can, in principle, comprise any other shapes.

It is preferred that the diameter D2 of the head section 32 and the diameter D3 of the foot section 34 are each larger than the diameter D1 of the bearing section 36. The bearing section 36 serves to axially guide the two snap-action discs 14, 18 and the contact ring 16 along the longitudinal axis 38 of the bearing section 36. Therefore, the inner diameter D5 of the contact ring 16 is larger than the diameter D1 of the bearing section 36, so that there is an annular gap between the contact ring 16 and the bearing section 36. There is also an annular gap between the bimetallic snap-action disc 14 and the bearing section 36 and between the snap-action spring disc 18 and the bearing section 36 in order to ensure the mobility of the two snap-action discs 14, 18 relative to the contact part 12. The inner diameter D5 of the contact ring 16 can correspond to the diameter of the through hole 20 and the diameter of the through hole 22. However, the two through holes 20, 22 of the snap-action discs 14, 18 do not necessarily have to have the same diameter. Nor does the diameter of the two through holes 20, 22 necessarily have to be the same as the inner diameter D5 of the contact ring 16.

The two snap-action discs 14, 18 and the contact ring 16 are mounted movably relative to the bearing section 36 along the bearing axis 38. The head section 32 and the foot section 34, on the other hand, each form an axial end stop which limits the upwardly and downwardly movement of the three aforementioned devices 14, 16, 18 along the longitudinal axis 38.

In order to be able to ensure the greatest possible mobility of the two snap-action discs 14, 16 within the limits defined by the head section 32 and the foot section 34, the contact ring 16 is preferably configured to be significantly smaller than the head section 32. In particular, the outer diameter D4 of the contact ring 16 is smaller than the diameter D2 of the head section 32. Furthermore, it is preferred that the diameter D2 of the head section 32 is significantly larger than the diameter D1 of the bearing section 36. In particular, the following is preferred: $D2 \geq 1.5\ D1$. A configuration of the head section 32 of the contact member 12 with a comparatively large diameter offers the advantage that the head section 32, in addition to its function as an end stop for the components 14, 16, 18, also serves as an arc shield, which shields the components 14, 16, 18 of the switching mechanism 10 from an arc that may occur on the top side of the head section 32 in the event of a switching operation.

FIGS. 2 and 3 show an embodiment of a temperature-dependent switch comprising a switching mechanism 10 according to the first embodiment shown in FIG. 1. The switch is denoted in its entirety with the reference numeral 100.

FIG. 2 shows the low-temperature state of the switch 100. FIG. 3 shows the high-temperature state of the switch 100.

The switch 100 comprises a switch housing 40, inside which the switching mechanism 10 is arranged. The switch housing 40 comprises a pot-like lower part 42 and a cover part 44, which is held on the lower part 42 by a bent or flanged upper edge 46.

In the embodiment of the switch 100 shown in FIGS. 2 and 3, both the lower part 42 and the cover part 44 are made of an electrically conductive material, preferably metal. An insulating foil 48 is arranged between the lower part 42 and the cover part 44. The insulating film 48 provides electrical insulation of the lower part 42 from the cover part 44. The insulating film 48 also provides a mechanical seal that prevents liquids or impurities from entering the interior of the housing from the outside.

Since the lower part 42 and the cover part 44 are each made of electrically conductive material in this embodiment, thermal contact to an electrical device to be protected can be established via their outer surfaces. The outer surfaces also serve as the electrical external terminals of the switch 100. For example, the outer surface 50 of the cover part 44 can function as the first electrical terminal and the outer surface 52 of the lower part 42 can function as the second electrical terminal.

Furthermore, as shown in FIGS. 2 and 3, a further insulating layer 54 can be arranged on the outside of the cover part 44.

The switching mechanism 10 is arranged clamped between the lower part 42 and the cover part 44. The contact member 12 is oriented with its head section 32 opposite a counter-contact 56 arranged on the inside 58 of the cover part 44. This counter-contact 56 is also referred to as the first stationary contact in the present case. The inside 60 of the lower part 42 serves as the second stationary contact.

In the state shown in FIG. 2, the switch 100 is in its low-temperature state, in which the temperature-independent snap-action spring disc 18 is in its first configuration and the temperature-dependent bimetallic snap-action disc 14 is in its low-temperature configuration. Thereby, the snap-action spring disc 18 presses the contact member 12 with its head section 32 against the mating contact 56. The outer, circumferential edge 62 of the snap-action spring disc 18 is supported on the inside 60 of the lower part 42.

The switch 100 is thus in its closed state, in which an electrically conductive connection is established between the first stationary contact 56 and the second stationary contact 60 via the contact member 12 and the snap-action spring disc 18. The contact pressure between the contact member 12 and the first stationary contact 56 is generated by the snap-action spring disc 18.

In this state of the switch 100, however, the bimetallic snap-action disc 14 hangs freely into the interior of the switch housing 40 with its outer, circumferential edge 64. More precisely, the snap-action spring disc 18 presses the contact ring 16 upwardly, whereby the latter also presses the bimetallic snap-action disc 14 upwardly against the head section 32 of the contact member 12. In the low-temperature state 100, the snap-action spring disc 18, the contact ring 16 and the bimetallic snap-action disc 14 are thus in their highest or uppermost position relative to the bearing section 36 of the contact member 12, viewed along the longitudinal axis 38 of the contact member. The current flows from the first electrical terminal 50 via the cover part 44, the first stationary mating contact 56 into the contact member 12 and from the contact member 12 via the bimetallic snap-action disc 14, the contact ring 16, the snap-action spring disc 18 and the second stationary contact 60 into the lower part 42 and ultimately to the second electrical terminal 52 (or vice versa).

By the contact ring 16 mounted movably on the contact member 12, manufacturing tolerances occurring on the two snap-action discs 14, 18 are usually automatically compensated, since this contact ring 16 ensures that the two snap-action discs 14, 18 are automatically pressed into the uppermost position in the low-temperature state of the switch 100, in which the bimetallic snap-action disc 14 bears against the bottom side of the head section 32 of the contact member 12. Accordingly, the manufacturing tolerances of the two snap-action discs 14, 18 need not be aligned with each other, since the switching mechanism 10 as a whole has an overall height measured along the longitudinal axis 38 which is adapted to the level of the interior of the switch housing 40, i.e. the distance between the lower part 42 and the cover part 44.

If the temperature of the device to be protected and thus the temperature of the switch 100 and the bimetallic snap-action disc 14 arranged therein now increases to the response temperature of the bimetallic snap-action disc 14 or above this response temperature, the bimetallic snap-action disc 14 snaps from its convex low-temperature configuration shown in FIG. 2 to its concave high-temperature configuration shown in FIG. 3. During this snap-action, the bimetallic snap-action disc 14 is supported with its outer edge 64 on the bottom side 58 of the cover part 44. With its center, the bimetallic snap-action disc 14 pulls the movable contact member 12 downwards and lifts the movable contact member 12 off the first stationary contact 56. As a result, the snap-action spring disc 18 simultaneously bends downwards at its center, so that the snap-action spring disc 18 snaps from its first stable geometric configuration shown in FIG. 2 to its second geometrically stable configuration shown in FIG. 3.

In the high-temperature state of the switch 100 shown in FIG. 3, the inner section 28 of the bimetallic snap-action disc 14 presses on the contact ring 16. The contact ring 16 in turn presses on the inner section 30 of the spring disc 18. In this state of the switch 100, the inner section 28 of the bimetallic snap-action disc 14, the contact ring 16 and the inner section 30 of the spring disc 18 are thus in their lowest position relative to the bearing section 36 of the contact member 12. When the two snap-action discs 14, 18 snapped from the state shown in FIG. 2 into the state shown in FIG. 3, not only is the contact member 12 as a whole displaced downwards along the longitudinal axis 38, but the inner sections 28, 30 of the two snap-action discs and the contact ring 16 are also displaced downwards along the longitudinal axis 38 relative to the contact member 12.

FIG. 3 shows the high-temperature state of the switch 100, in which the switch 100 is open. The circuit is thus interrupted.

If the device to be protected and thus the switch 100 including the bimetallic snap-action disc 14 then cools down again, the bimetallic snap-action disc 14 snaps back into its low-temperature state when the reset temperature, which is also referred to as the switch-back temperature, is reached, as shown in FIG. 2, for example. The switch 100 therefore has a temperature-dependent, reversible switching behavior.

Figure 4:
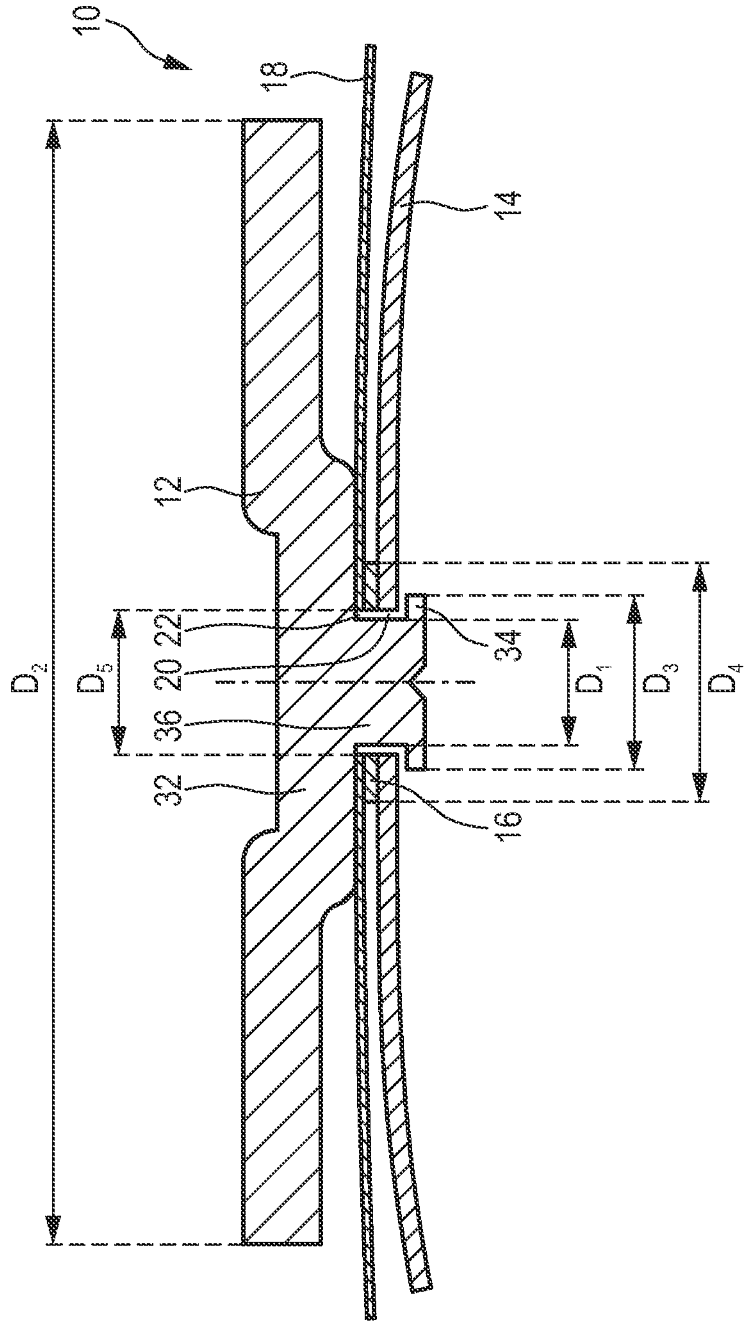
FIG. 4 shows a schematic sectional view of a temperature-dependent switching mechanism according to a second embodiment.

FIG. 4 shows a second embodiment of the switching mechanism 10. Again, the switching mechanism 10 comprises a contact member 12, a bimetallic snap-action disc 14, a contact ring 16 and a snap-action spring disc 18. The bimetallic snap-action disc 14, the contact ring 16 and the snap-action spring disc 18 are also movably but captively mounted on the contact member 12 in this embodiment.

The basic structure of the switching mechanism 10 mentioned above with regard to the first embodiment shown in FIG. 1 is also realized in a similar way in the second embodiment of the switching mechanism 10 shown in FIG. 4, which is why the differences to the first embodiment are essentially emphasized in the following.

There is a fundamental difference in the shape of the contact member 12. It is true that the contact member 12 here also comprises the three different sections 32, 34, 36 which are integrally connected to one another, and the functions of these three sections 32, 34, 36 are also the same as before. However, in the second embodiment of the switching mechanism 10 shown in FIG. 4, the head section 32 of the contact member 12 in particular comprises a slightly different shape.

Instead of being cap-shaped, the head section 32 of the contact member 12 is essentially plate-shaped here. In addition, the head section 32 is even wider than in the first embodiment. The reason for this is, in particular, that in the embodiment shown in FIG. 4, as explained in the following, the contact member 12 acts as a contact plate or contact bridge, which in the low-temperature state of the switch 100 comes into direct contact with or rests against both stationary contacts 56, 60 of the switch 100.

A further difference in the first embodiment shown in FIG. 1 is that the states of the two snap-action discs 14, 18 are reversed. It is true that the two snap-action discs 14, 18 are still arranged on opposite sides of the contact ring 16. However, in the second embodiment of the switching mechanism 10 shown in FIG. 4, the bimetallic snap-action disc 14 is arranged below the contact ring 16 and the snap-action spring disc 18 is arranged above the contact ring 16.

Figure 5:
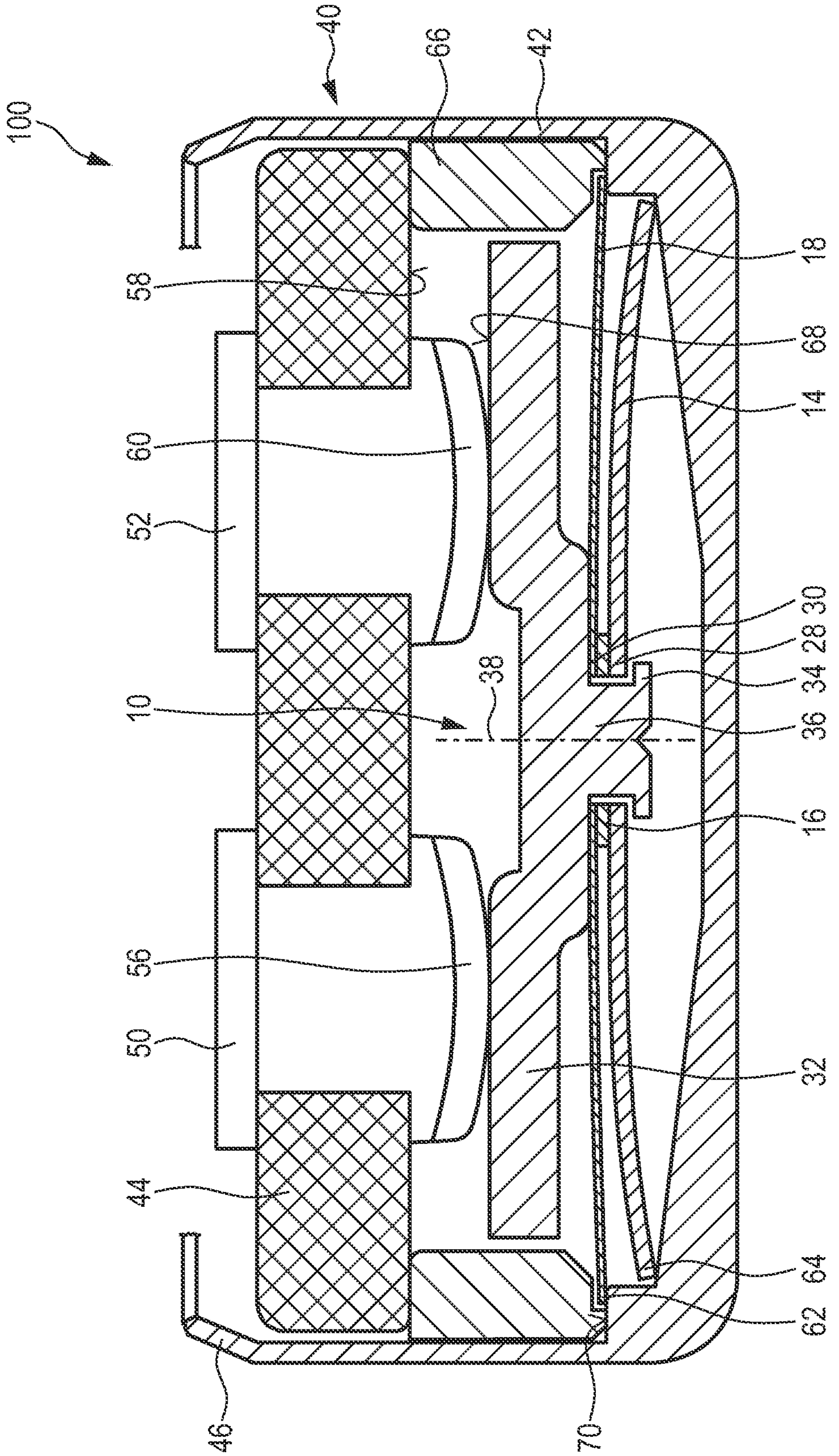
FIG. 5 shows a schematic sectional view of a temperature-dependent switch having the switching mechanism shown in FIG. 4, wherein the switch is in its low-temperature state.
Figure 6:
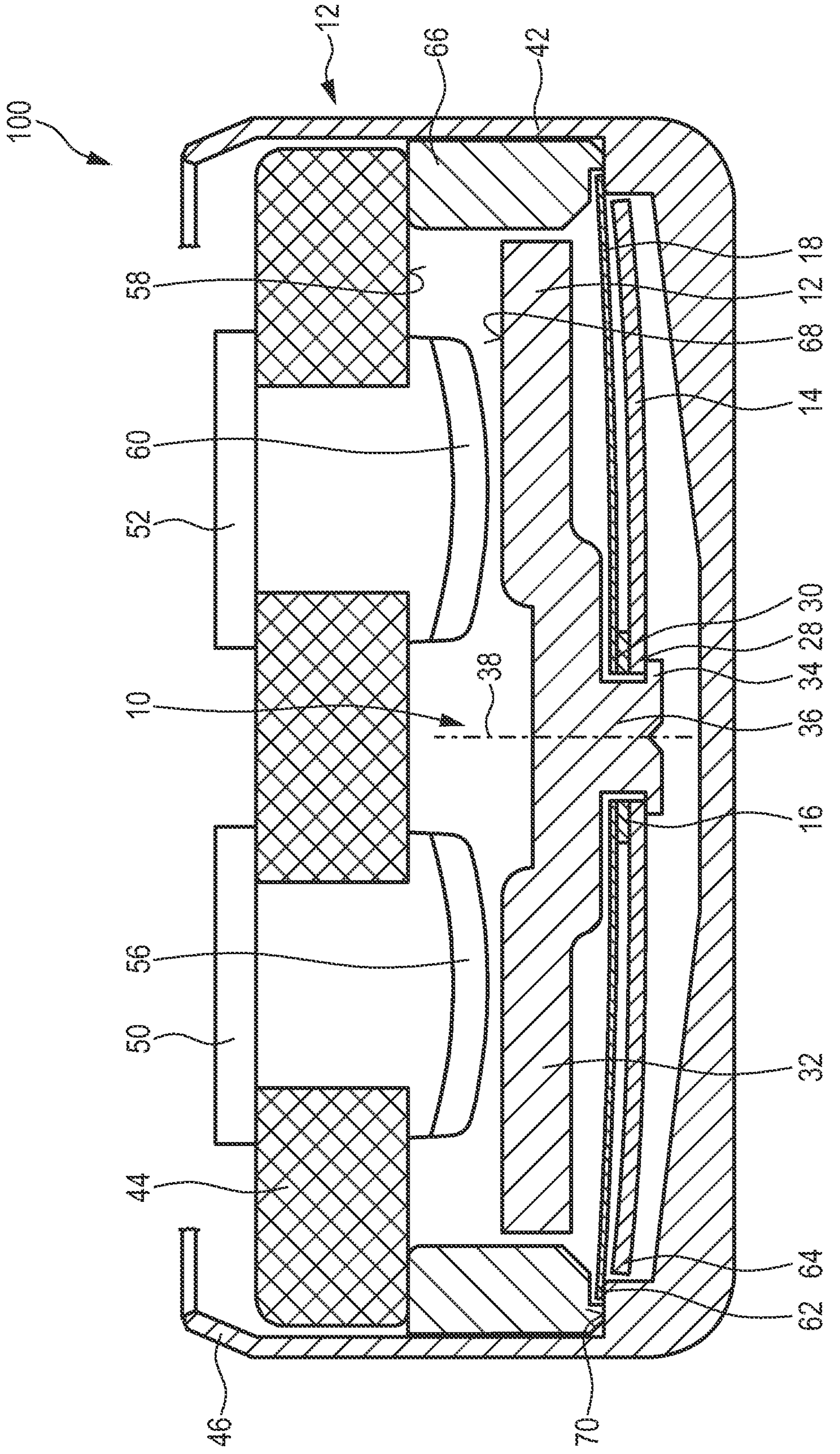
FIG. 6 shows a schematic sectional view of the switch shown in FIG. 5, wherein the switch is in its high-temperature state.

FIGS. 5 and 6 show an embodiment of the switch 100 in which the switching mechanism 10 shown in FIG. 4 is used in accordance with the second embodiment. Again, FIG. 5 shows the low-temperature state of the switch 100 and FIG. 6 shows the high-temperature state of the switch 100. The same or equivalent components to the first embodiment of the switch 100 shown in FIGS. 2 and 3 are indicated by the same reference signs in the second embodiment of the switch 100 shown in FIGS. 5 and 6.

The switch 100 also comprises a switch housing 40 in which the temperature dependent switching mechanism 10 is arranged. The housing 40 comprises a pot-like lower part 42 and a cover part 44 closing the lower part 42. The cover part 44 is held on the lower part 42 by a bent-over upper edge 46 of the lower part 42. For reasons of clarity, the bent-over edge 46 is not illustrated extending across the lid part 44 and is bent down completely onto the lid part 44.

The lower part 42 is preferably made of an electrically conductive material, e.g. metal. In the embodiment shown in FIGS. 5 and 6, however, the cover part 44 is made of electrically insulating material, for example plastic or ceramic.

A spacer ring 66 is arranged between the cover part 44 and the lower part 42, which keeps the cover part 44 at a distance from the lower part 42.

The cover part 44 comprises a first stationary contact 56 and a second stationary contact 60 on its inner side 58. The two stationary contacts 56, 60 are each configured as a rivet which extends through the cover part 44. The outer sides of these two rivets can be used as first and second electrical terminals 50, 52 of the switch 100.

In the low-temperature state of the switch 10 shown in FIG. 5, the contact member 12 bears with the top side 68 of its head section 32 against the two stationary contacts 56, 60, so that in this switching state the contact member 12 provides an electrically conductive connection between the two stationary contacts 56, 60.

Accordingly, the contact member 12 is again made of electrically conductive material, e.g. metal. The top side 68 of the contact member 12 can be coated with an electrically conductive coating to improve conductivity.

The contact pressure with which the contact member 12 is pressed against the two stationary contacts 56, 60 in the low-temperature state of the switch 10 shown in FIG. 5 is generated by the snap-action spring disc 18. With its inner section 30, the snap-action spring disc 18 presses from below against the bottom side of the head section 32 of the contact member 12. With its outer edge 62, the snap-action spring disc 18 is thereby supported on a circumferential shoulder 70 configured in the lower part 42. The spacer ring 66 is also arranged on this shoulder 70. The circumferential edge 62 of the snap-action spring disc 18 is fixed between the shoulder 70 and the spacer ring 66.

With its inner edge area 28, the bimetallic snap-action disc 14 presses the contact ring 16 from below against the snap-action spring disc 18. Thereby, the outer, circumferential edge 64 of the bimetallic snap-action disc 14 is supported on the inner bottom of the lower part 42 of the housing 40.

If the temperature of the switch 100 and thus the temperature of the bimetallic snap-action disc 14 now increases from the low-temperature state shown in FIG. 5 to the response temperature of the bimetallic snap-action disc or above it, the bimetallic snap-action disc 14 snaps from its convex position shown in FIG. 5 to its concave position shown in FIG. 6. The outer edge 64 of the bimetallic snap-action disc 14 then rests against the snap-action spring disc 18. At the same time, the inner section 28 of the bimetallic snap-action disc 14 presses upwardly on the base section 34 of the contact member 12 and thereby pulls the contact member 12 downwardly away from the two stationary contacts 56, 60.

The snap-action spring disc 18 thereby also snaps from its first position shown in FIG. 5 to its second position shown in FIG. 6, in which it presses the contact ring 16 from upwardly onto the inner section 28 of the bimetallic snap-action disc 14 with its inner section 30.

Thus, also in this embodiment, when switching from the low-temperature state to the high-temperature state of the switch 100, there is not only a downward positional displacement of the contact member 12 along the longitudinal axis 38, but also a downward displacement of the devices 14, 16, 18 relative to the contact member 12 along the longitudinal axis 38.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms “for example,” “e.g.,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A temperature-dependent switching mechanism for a temperature-dependent switch, comprising:
- an electrically conductive contact member;
- a contact ring arranged around and movably mounted on the electrically conductive contact member; and
- a bimetallic snap-action disc comprising a first through hole through which the electrically conductive contact member is passed, wherein the bimetallic snap-action disc is arranged on a first side of the contact ring and is movably mounted on the electrically conductive contact member,
- wherein the electrically conductive contact member comprises a bearing section extending along a longitudinal axis, a head section at a first axial end of the bearing section, and a foot section at a second axial end of the bearing section opposite the first axial end,
- the contact ring and the bimetallic snap-action disc being supported on the bearing section for axial movement relative to the bearing section along the longitudinal axis between the head section and the foot section, and
- the head section and the foot section defining axial end stops delimiting the axial movement.

2. The temperature-dependent switching mechanism according to claim 1, wherein the bimetallic snap-action disc comprises an inner section surrounding the first through hole, wherein the inner section bears against the contact ring.

3. The temperature-dependent switching mechanism according to claim 1, wherein the bimetallic snap-action disc is configured to switch in a temperature-dependent manner between a geometric low-temperature configuration and a geometric high-temperature configuration, and wherein the contact ring is configured to move relative to the electrically conductive contact member when the bimetallic snap-action disc switches from its geometric low-temperature configuration to its geometric high-temperature configuration.

4. The temperature-dependent switching mechanism according to claim 1, wherein the bearing section having a first diameter, the head section having a second diameter larger than the first diameter, and the foot section having a third diameter larger than the first diameter.

5. The temperature-dependent switching mechanism according to claim 4, wherein the bearing section is cylindrical.

6. The temperature-dependent switching mechanism according to claim 4, wherein an inner diameter of the contact ring is larger than the first diameter, so that there is an annular gap between the contact ring and the bearing section of the electrically conductive contact member.

7. The temperature-dependent switching mechanism according to claim 4, wherein a diameter of the first through hole is larger than the first diameter, so that there is an annular gap between the bimetallic snap-action disc and the bearing section of the electrically conductive contact member.

8. The temperature-dependent switching mechanism according to claim 4, wherein an outer diameter of the contact ring is smaller than the second diameter.

9. The temperature-dependent switching mechanism according to claim 4, wherein the second diameter is at least 50% larger than the first diameter.

10. The temperature-dependent switching mechanism according to claim 4, wherein the bearing section is integrally formed in one piece with the head section and the foot section.

11. The temperature-dependent switching mechanism according to claim 1, further comprising a temperature-independent snap-action spring disc comprising a second through hole through which the electrically conductive contact member is passed, wherein the snap-action spring disc is arranged on a second side of the contact ring opposite the first side and is movably mounted on the electrically conductive contact member.

12. The temperature-dependent switching mechanism according to claim 11, wherein the first through hole is arranged centrally in the bimetallic snap-action disc, and wherein the second through hole is arranged centrally in the snap-action spring disc.

13. The temperature-dependent switching mechanism according to claim 11, wherein the bimetallic snap-action disc and the snap-action spring disc are each circular disc-shaped.

14. A temperature-dependent switch, comprising:

a temperature-dependent switching mechanism; and a switch housing surrounding the temperature-dependent switching mechanism and having a first electrical terminal and a second electrical terminal;

wherein the temperature-dependent switching mechanism comprises:

an electrically conductive contact member;

a contact ring arranged around and movably mounted on the electrically conductive contact member; and a bimetallic snap-action disc comprising a first through hole through which the electrically conductive contact member is passed, wherein the bimetallic snap-action disc is arranged on a first side of the contact ring and is movably mounted on the electrically conductive contact member;

wherein the temperature-dependent switching mechanism is configured to establish an electrical connection between the first and the second electrical terminal below a response temperature of the bimetallic snap-action disc and to interrupt the electrical connection upon exceeding the response temperature, wherein the electrically conductive contact member comprises a bearing section extending along a longitudinal axis, a head section at a first axial end of the bearing section, and a foot section at a second axial end of the bearing section opposite the first axial end, the contact ring and the bimetallic snap-action disc being supported on the bearing section for axial movement relative to the bearing section along the longitudinal axis between the head section and the foot section, and the head section and the foot section defining axial end stops delimiting the axial movement.

15. The temperature-dependent switch according to claim 14, wherein the temperature-dependent switching mechanism is configured to press the electrically conductive contact member below the response temperature of the bimetallic snap-action disc directly against a stationary mating contact electrically connected to the first electrical terminal and arranged inside the switch housing in order to establish the electrical connection.

* * * * *